US 8,040,412 B2

(12) United States Patent
Yamamoto (10) Patent No.: US 8,040,412 B2
(45) Date of Patent: Oct. 18, 2011

(54) IMAGING APPARATUS AND IMAGE DATA CORRECTING METHOD (75) Inventor: Norikazu Yamamoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 540 days.

(21) Appl. No.: 11/643,777

(22) Filed: Dec. 22, 2006

(65) Prior Publication Data

US 2007/0146497 A1 Jun. 28, 2007

(30) Foreign Application Priority Data

Dec. 26, 2005 (JP) ................................. 2005-371449

(51) Int. Cl.
H04N 3/14 (2006.01)
(52) U.S. Cl. .................... 348/273; 348/272; 348/370
(58) Field of Classification Search .................. None
See application file for complete search history.

(56) References Cited

U.S. PATENT DOCUMENTS 4,827,333 A * 5/1989 Iwabe ........................... 348/263
7,057,659 B1 * 6/2006 Mihara et al. ................ 348/345
7,551,208 B2 * 6/2009 Abe ............................. 348/223.1

FOREIGN PATENT DOCUMENTS

JP 2002-199410 7/2002
JP 2007-158628 6/2007

* cited by examiner

Primary Examiner — David Ometz
Assistant Examiner — Angel L Garces-Rivera
(74) Attorney, Agent, or Firm — Wenderoth, Lind & Ponack, L.L.P.

(57) ABSTRACT

An imaging apparatus includes an optical system, plural types of color filters, an imaging device including a plurality of pixels each receiving a light incident to the imaging apparatus through a predetermined type of color filter and being operable to generate image data with the plurality of pixels from the image formed by the optical system, a light information acquiring section operable to acquire information on the incident light, and a correction processing section operable to convert a position of a pixel of the image data formed by the pixels, according to at least type of the color filter provided for the pixel and the information on the incident light acquired by the light information acquiring section.

12 Claims, 12 Drawing Sheets

| | IMAGE HEIGHT | CHROMATIC ABERRATION (μm) | | DIFFERENCE 1 (c) (b)−(a) (μm) | DIFFERENCE 2 (d) (c)/2.2 (PIXEL) |
|---|---|---|---|---|---|
| | | A (a) | D65 (b) | | |
| B−G | 0.00 | <0.001 | <0.001 | ≒0.00 | ≒0.00 |
| | 0.50 | 2.129 | 3.670 | 1.54 | 0.70 |
| | 0.75 | 4.192 | 6.566 | 2.37 | 1.08 |
| | 0.90 | 6.519 | 9.585 | 3.07 | 1.39 |
| | 1.00 | 7.795 | 11.687 | 3.89 | 1.77 |
| R−G | 0.00 | <0.001 | <0.001 | ≒0.00 | ≒0.00 |
| | 0.50 | 1.102 | 1.007 | −0.10 | −0.04 |
| | 0.75 | 0.905 | 0.669 | −0.24 | −0.11 |
| | 0.90 | 0.991 | 0.466 | −0.53 | −0.24 |
| | 1.00 | 1.263 | 0.575 | −0.69 | −0.31 |

IMAGING APPARATUS AND IMAGE DATA CORRECTING METHOD

BACKGROUND ART

1. Field of the Invention

The present invention relates to an imaging apparatus such as a digital still camera, and more particularly to image data correcting technique relating to chromatic aberration.

2. Related Art

In recent years, a remarkable development has been made in the digital imaging apparatus such as a digital still camera, and a model of a high number of pixels that attains light weight and small size has been rapidly spread. Along with this, a small-sized and thin-shaped lens is also required and developed in an optical system such as a digital still camera.

However, when reduction in size and reduction in thickness progresses in this way, it becomes difficult to adequately maintain various kinds of basic optical performance such as aberration and resolution. Particularly, an influence of the chromatic aberration generated by dispersion characteristics of an optical material of a lens itself poses a large problem in maintaining the optical performance.

Figure 12A:
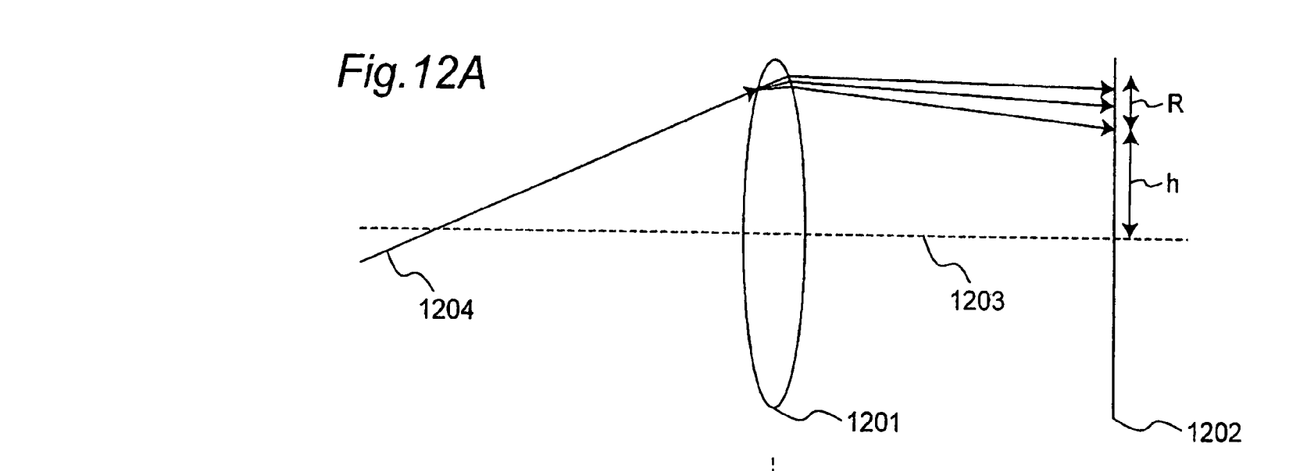
FIGS. 12A and 12B are views for explaining the chromatic aberration.

The chromatic aberration means, as shown in FIG. 12A, a phenomenon in that image height h on the imaging device 1202 which is a distance from an optical axis 1203 diffuses in a definite range R by dispersion of a white color light 1204 due to a difference in refractive index to a wavelength of light. For an actual subject, it is frequently recognized as a phenomenon that a boundary between dark part and light part of an image on an imaging plane blurs into rainbow color.

Figure 12B:
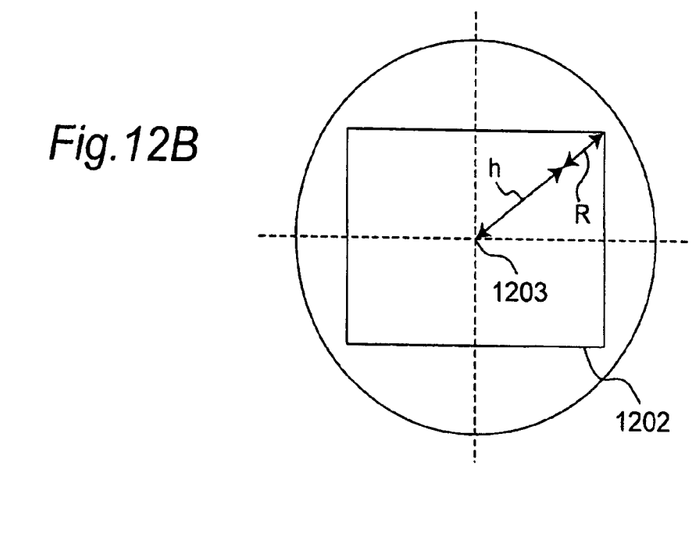

FIG. 12B is a view of the imaging device 1202 viewed along a direction of the optical axis 1203. An image height "h" shows the distance from the optical axis 1203 which is a center of the imaging device. Normally, the image height at a position of the optical axis 1203 is defined as 0, and the image height at a position of any one of the vertex of the imaging device 1202 is defined as 1.

Further, as a pixel size of the imaging device becomes smaller as pixel density is increased in the imaging device, the influence of the chromatic aberration per each pixel becomes remarkable. Therefore, correcting the chromatic aberration is a technique indispensable for reducing the size and thickness of the optical system.

As a conventional correcting means of the chromatic aberration, there is an example for storing previously chromatic aberration characteristic data of the optical system and correcting a position of a pixel corresponding to each color of a color filter of the imaging device in accordance with information such as a focal point distance of the optical system. For example, a digital camera disclosed in JP-A-2002-199410 can correct image deterioration in image data caused by the chromatic aberration and a distortion aberration of the optical system, based on chromatic aberration characteristics and distortion aberration characteristics of the optical system stored in a built-in memory.

An output data of the pixel corresponding to each color of the color filter of the imaging device is changed by an ambient light source. Therefore amount of chromatic aberration is not always a fixed value. In daily life, the ambient light source is largely changed from an incandescent bulb to blue sky of clear day, and therefore the chromatic aberration changing amount is also large. Particularly, there is a tendency that the chromatic aberration changing amount becomes large in a range from blue color to ultraviolet. When using a relatively inexpensive small-sized optical system having not so high optical performance, such an optical system suffers largely from the influence of the chromatic aberration.

Therefore, when correcting the image data with only chromatic aberration characteristics of the optical system determined under a certain condition as prior art, changing amount of the chromatic aberration according to the difference of the ambient light source can not be recognized. Thus there is a problem in which deficient or excessive correction of the chromatic aberration may occur depending on the ambient light source on taking an image. Particularly, in a case of the excessive correction, there is a problem of causing an unnecessary deterioration of an image quality such as deterioration of resolution and contrast in peripheral areas of the image.

The present invention is provided to solve the above-described problems, and an object of the invention is to provide an imaging apparatus capable of reducing an image quality deterioration due to the chromatic aberration and its correction, by properly correcting the image data in accordance with changing amount of the chromatic aberration generated from the difference of the ambient light source, even when the relatively inexpensive small-sized optical system having not so high optical performance is used.

Still another object of the present invention is to provide an image data correction method which is effective to processing of image data generated by the imaging device, so-called RAW data, using other information processor such as a personal computer.

SUMMARY OF THE INVENTION

In a first aspect of the invention, provided is an imaging apparatus including an optical system operable to form an image of a subject;

plural types of color filters;

an imaging device including a plurality of pixels each of which receives a light incident to the imaging apparatus through a predetermined type of color filter and being operable to generate image data with the plurality of pixels from the image formed by the optical system;

a light information acquiring section operable to acquire information on the incident light; and a correction processing section operable to convert a position of a pixel of the image data formed by the pixels, according to at least type of the color filter provided for the pixel and the information on the incident light acquired by the light information acquiring section.

In a second aspect of the invention, provided is an imaging apparatus including:

an optical system operable to form an image of a subject;

plural types of color filters;

a plurality of imaging devices, each imaging device including a plurality of pixels, each pixel receiving a light incident to the imaging apparatus through a color filter, type of the color filter provided for each imaging device is different depending on the imaging device, the plurality of imaging devices being operable to generate image data with the plurality of pixels from the image formed by the optical system;

a light information acquiring section operable to acquire information on the incident light; and a correction processing section operable to convert a position of a pixel of the image data formed by the pixels, according to at least type of the color filter provided for the pixel and the information on the incident light acquired by the light information acquiring section.

In a third aspect of the invention, provided is a method of correcting image data which is formed by an imaging device having a plurality of pixels receiving incident light through a plurality of color filters. The method includes:

acquiring information on the incident light based on the image data or data generated by applying a predetermined process to the image data; and converting a position of a pixel of the image data, according to at least type of the color filter provided for the pixel and the information on the incident light.

In a fourth aspect of the invention, provided is a method of correcting image data which is formed by a plurality of imaging devices. Each imaging device has a plurality of pixels, and each pixel receives incident light through a color filter. Type of a color filter provided for each imaging device is different depending on the imaging device. The method includes:

acquiring information on the incident light based on the image data or data generated by applying a predetermined process to the image data; and converting a position of a pixel of the image data, according to at least type of the color filter provided for the pixel and the information on the incident light.

As described above, when correcting the color aberration, the imaging apparatus according to the present invention corrects the image data based on at least type of color filters arranged in the front of the plurality of pixels and the information on the light that enters the imaging apparatus. Thus, it is possible to correct image data in accordance with changing amount of the chromatic aberration caused depending on the type of the ambient light source.

Therefore, even when using the relatively inexpensive small-sized optical system having not so high optical performance, it is possible to provide the imaging apparatus reducing image quality deterioration caused by the color aberration and correction.

DETAIL DESCRIPTION OF THE PREFERRED EMBODIMENT

Embodiments of the present invention will be explained with reference to the drawings.

First Embodiment

Figure 1:
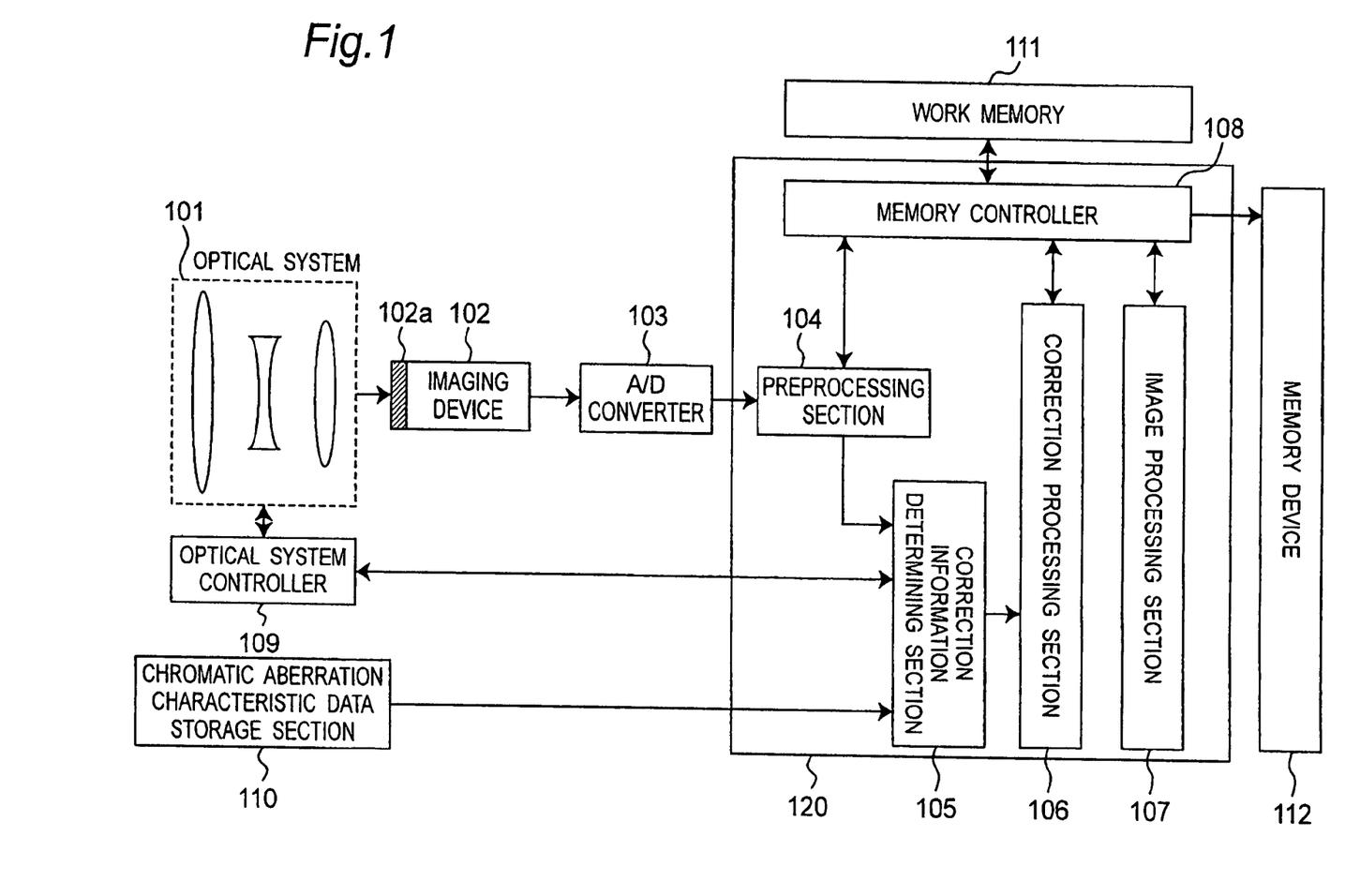
FIG. 1 is a block diagram of an imaging apparatus according to a first embodiment of the present invention.

FIG. 1 is a block diagram showing a configuration of a digital still camera which is an example of an imaging apparatus according to a first embodiment of the present invention.

In FIG. 1, the digital still camera as an imaging apparatus includes an optical system 101 containing lenses, an imaging device 102 for converting an optical signal from the optical system 101 to an electrical signal, an A/D converter 103 for converting an analog image signal from the imaging device 102 to a digital image signal, and an image signal processing section 120 for processing the digital signal from the A/D converter 103.

The digital still camera further includes an optical system controller 109 for controlling drive of the optical system 101, a chromatic aberration characteristic data storage section 110 for storing characteristic data of chromatic aberration, a work memory 111 for temporally storing data to be processed by the image processing section 120, and a memory device 112 for storing image data taken by the digital still camera.

1.1 Change of Amount of Chromatic Aberration Depending on Ambient Light Source

An imaging device 102 is a photoelectric conversion element that converts an image formed on a light receiving position through an optical system 101 into an electric signal by a pixel per each light receiving position. The imaging device 102 can be a CCD image sensor, a CMOS image sensor, or the like.

The photoelectric conversion element such as CCD image sensor or CMOS image sensor has a high sensitivity in an infrared region. Therefore, generally, it is so designed that infrared rays are prevented from entering the photoelectric conversion element by disposing an infrared ray removing means such as an infrared cut glass or an infrared cut filter before the photoelectric conversion element. Thus the photoelectric conversion element is adjusted to have sensitivity characteristic similar to that of human eye. In FIG. 1, the infrared ray removing part is omitted.

Figure 2:
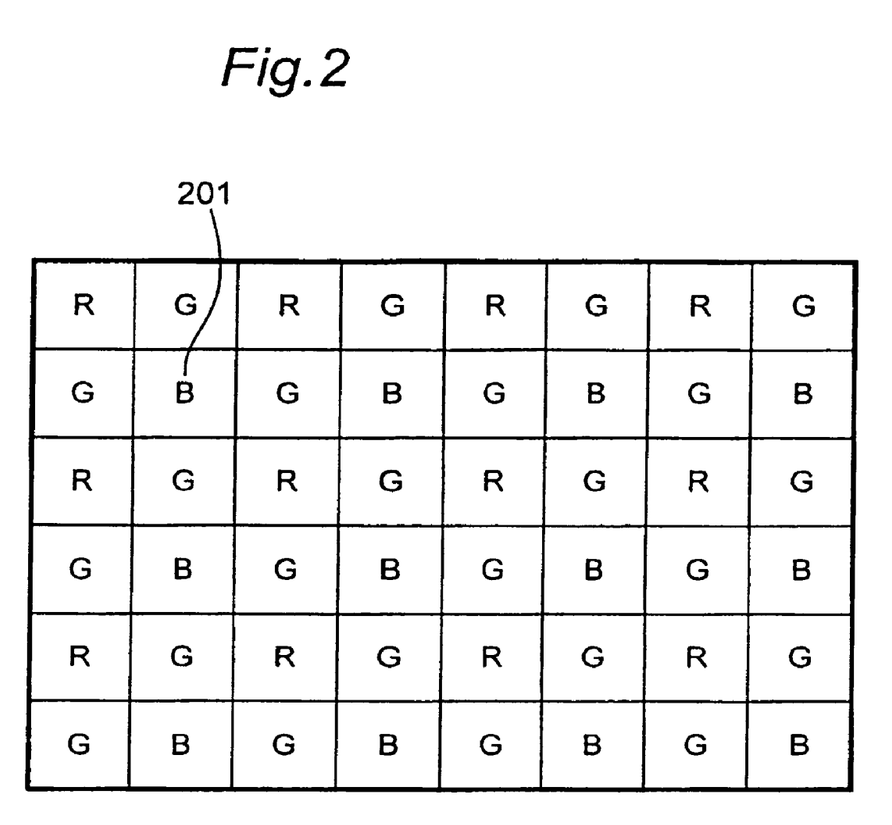
FIG. 2 is a schematic view of a Bayer array.

In front of each pixel included in the imaging device 102, a color filter 102a of either one color of R(red), G(green) and B(blue) is provided. Each color filter, for example, is regularly arranged like a Bayer array as shown in FIG. 2.

The light that enters through the optical system 101 is imaged on the imaging device 102 through the infrared ray removing means and each color filter of R(red), G(green) and B(blue), and is converted into the electric signal in accordance with an intensity of the light of R(red), G(green) and B(blue).

Figure 3:
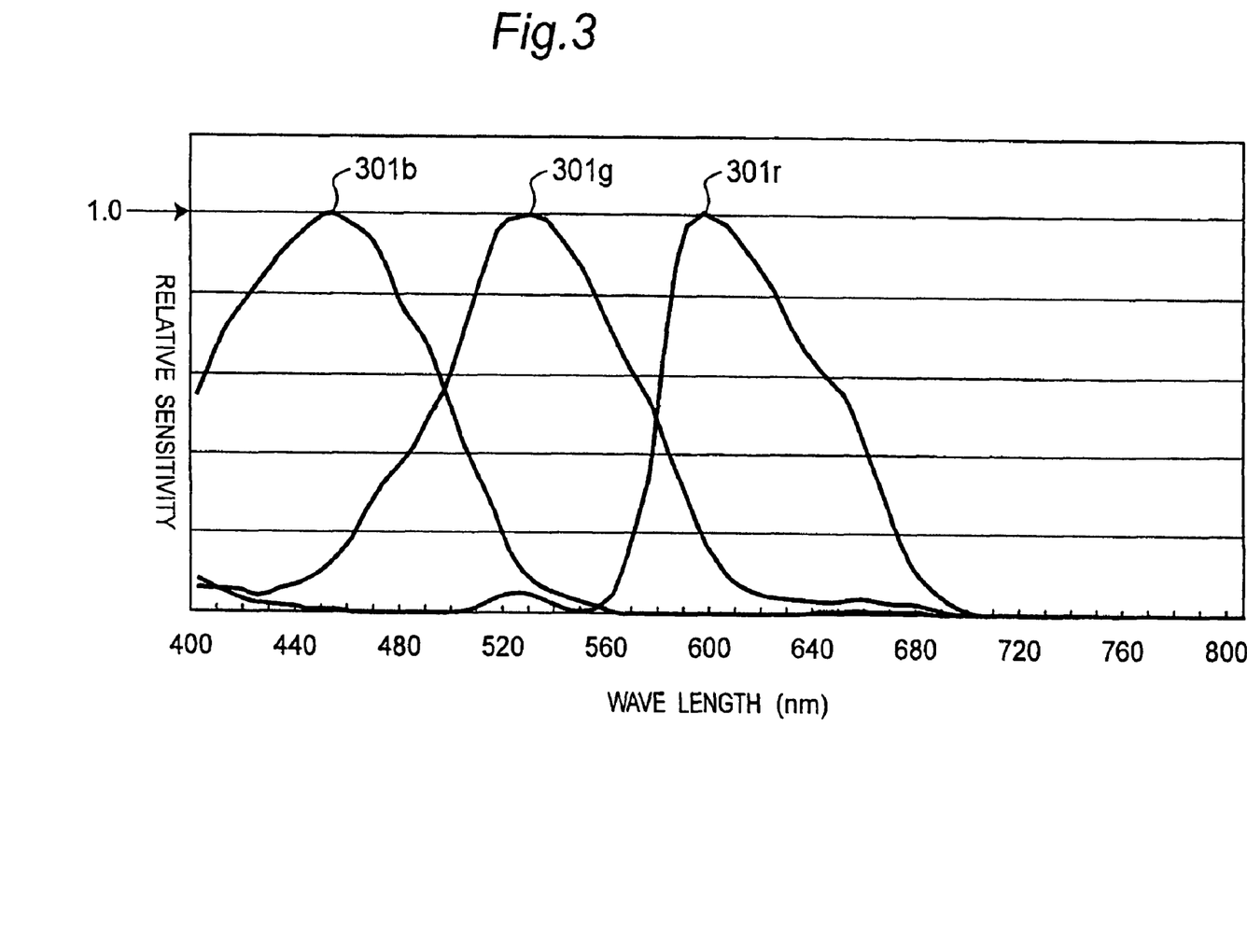
FIG. 3 is a view showing an example of spectral sensitivity of an imaging device.

FIG. 3 shows an example of the sensitivity characteristics when a white color light enters the imaging device 102. Three curved lines show sensitivity 301r for R(red), sensitivity 301g for G(green), and sensitivity 301b for B(blue), respectively. A wavelength of light is taken on the horizontal axis, and relative sensitivity is taken on the vertical axis. The sensitivity 301r for R(red), sensitivity 301g for G(green), and sensitivity 301b for B(blue) are respectively normalized so as to set the peak value thereof at 1.0.

Figure 4:
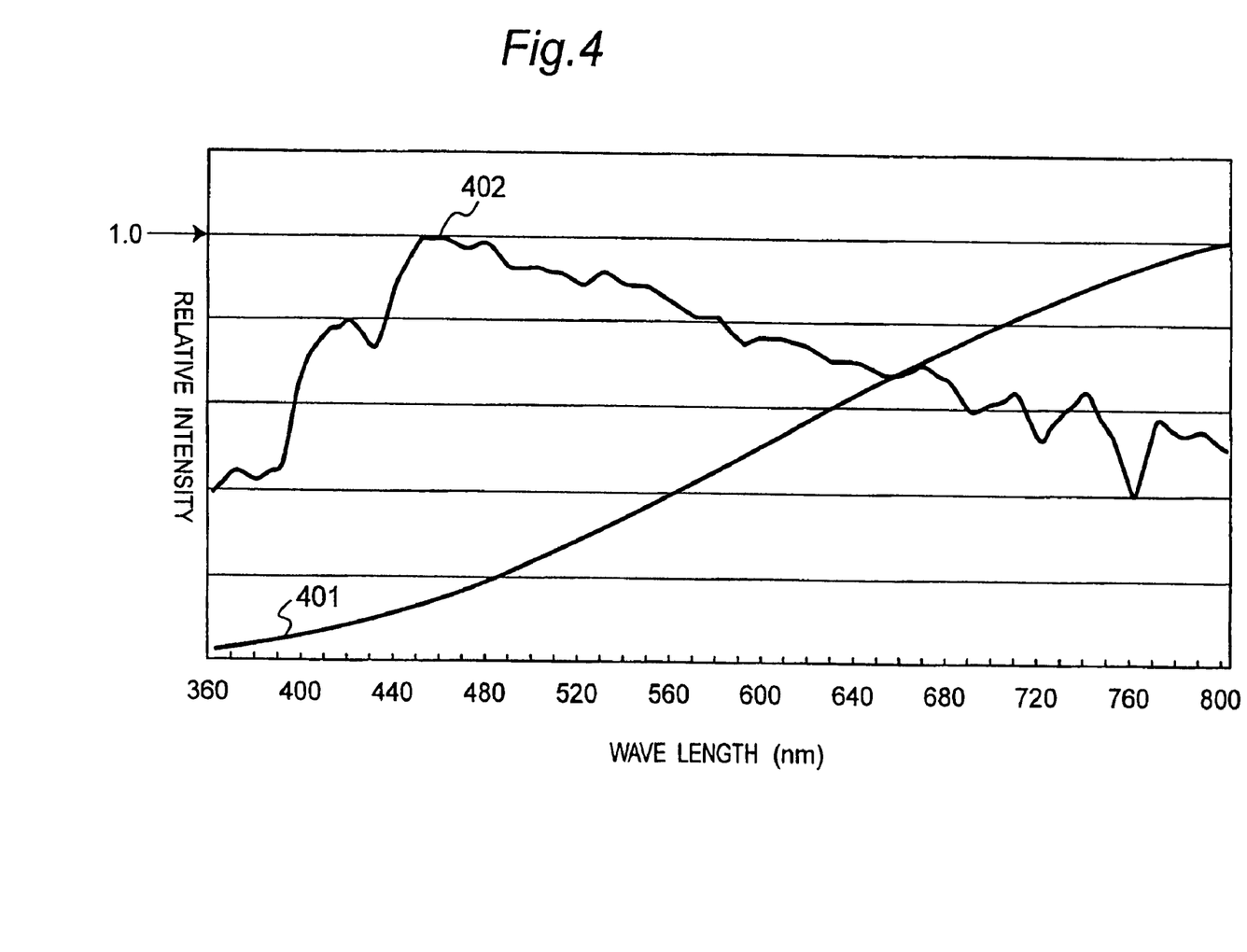
FIG. 4 is a view showing a view of a spectral distribution of a typical ambient light source.
Figure 5A:
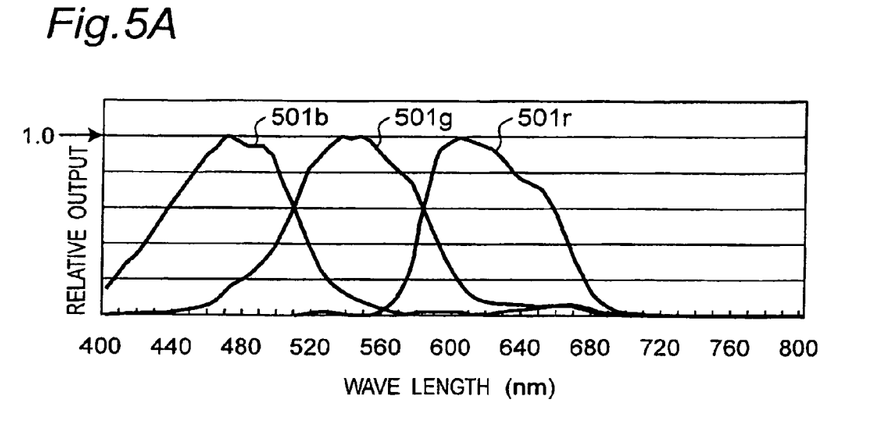
FIGS. 5A and 5B are views showing the example of the spectral sensitivity of the imaging device for the typical ambient light source.
Figure 5B:
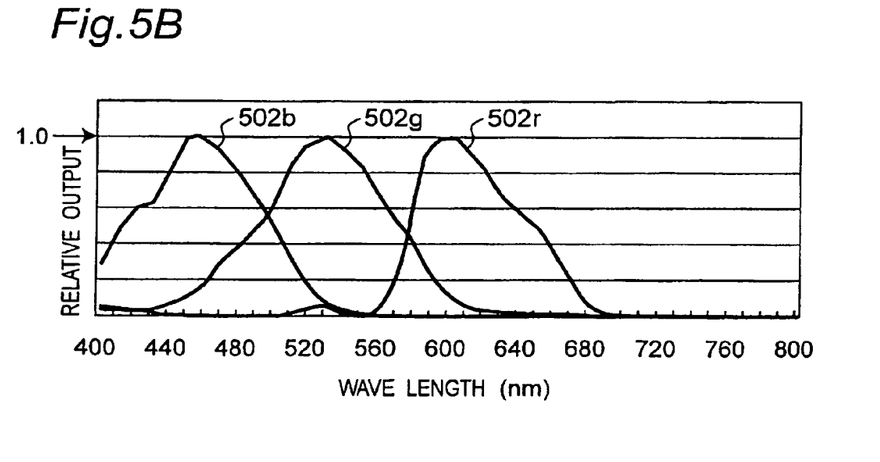

FIGS. 5A and 5B shows output characteristics of the imaging device 102 having sensitivity characteristics as shown in FIG. 3 to a white color light, when the ambient light source such as a standard light A (401) and a standard light $D_{65}$(402) having characteristics as shown in FIG. 4 enters the imaging device 102.

The standard light A (401) is a light with color temperature of about 2856 K defined by CIE, and is close to a light emitted from an incandescent bulb. Meanwhile, the standard light $D_{65}$ (402) is a light with color temperature of about 6504 K defined by CIE, and is close to a normal daylight including ultraviolet.

In FIG. 4, the wavelength of the light is taken on the horizontal axis, and a relative intensity is taken on the vertical axis. The standard light A (401) and standard light D65(402) are respectively normalized so as to set the peak value thereof at 1.0.

FIG. 5A shows the output characteristics when the standard light A (401) enters the imaging device 102. Output 501r for R(red), output 501g for G(green), and output 501b for B(blue) are all deviated toward the infrared ray. The output 501b for B(blue) at wavelength 400 nm is about 15% of the peak output.

FIG. 5B shows the output characteristics when the standard light $D_{65}$(402) enters the imaging device 102. Among output 502r for R(red), output 502g for G(green), and output 502b for B(blue), particularly the output 502b for B(blue) is largely deviated toward the ultraviolet ray. The output 502b for B(blue) at wavelength 400 nm is about 30% of the peak output.

In FIGS. 5A and 5B, the wavelength of light is taken on the horizontal axis, and a relative output is taken on the vertical axis. The output 501r and 502r for R(red), output 501g and 502g for G(green), and output 501b and 502b for B(blue) are respectively normalized so as to set peak value thereof at 1.0.

Figure 6A:
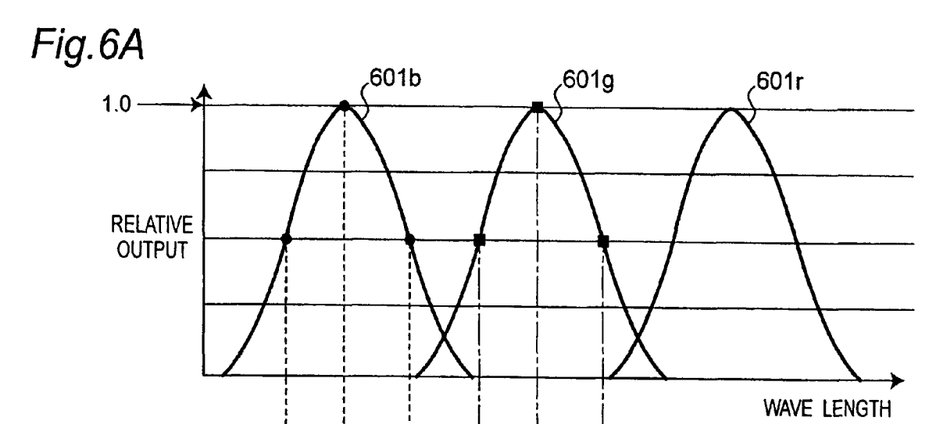
FIGS. 6A and 6B are views showing a relation between spectral sensitivity characteristics and chromatic aberration amount.
Figure 6B:
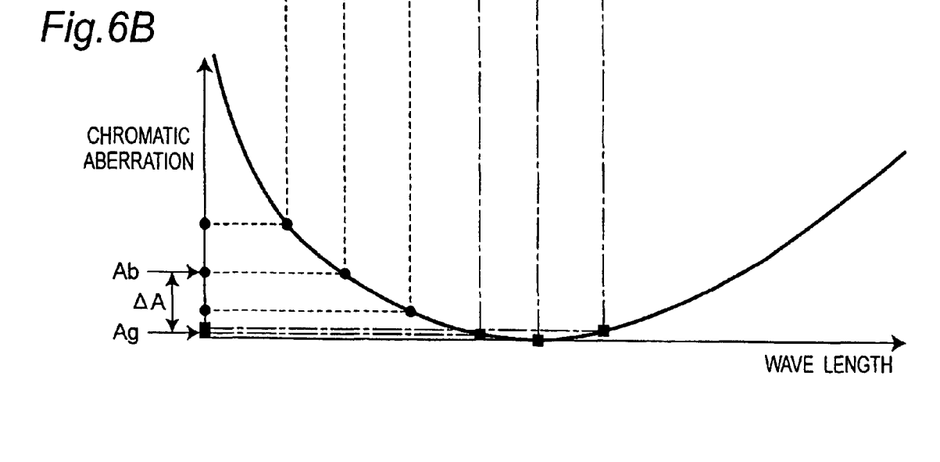

Next, FIGS. 6A and 6B schematically show relations between the output characteristics and the chromatic aberration amount. FIG. 6A shows the output characteristics of the imaging device 102. Three curved lines show output 601r for R(red), output 601g for G(green), and output 601b for B(blue), respectively. The wavelength of light is taken on the horizontal axis, and the relative output is taken on the vertical axis. The output 601r for R(red), output 601g for G(green), and output 601b for B(blue) are normalized so as to set peak value thereof at 1.0, respectively.

FIG. 6B shows the relation between the wavelength of light and the chromatic aberration amount at a certain image height. For example, the chromatic aberration amount corresponding to three points shown with "•" on the curved line showing the output 601b for B(blue) is obtained, and a gravity center of the chromatic aberration amount is defined as chromatic aberration amount (Ab) of B(blue). Similarly, the chromatic aberration amount corresponding to three points as shown with black square on the curved line showing the output 601g for G(green) is obtained, and the gravity center of the chromatic aberration amount is defined as the chromatic aberration amount (Ag) of G(green). Although the same thing can be said for R(red), this is not shown because the figure becomes complicated. At this time, by subtracting the chromatic aberration amount Ag of G(green) from the chromatic aberration amount Ab of B(blue), an amount of deviation ΔA of B(blue) with respect to G(green) is obtained.

Figure 7:
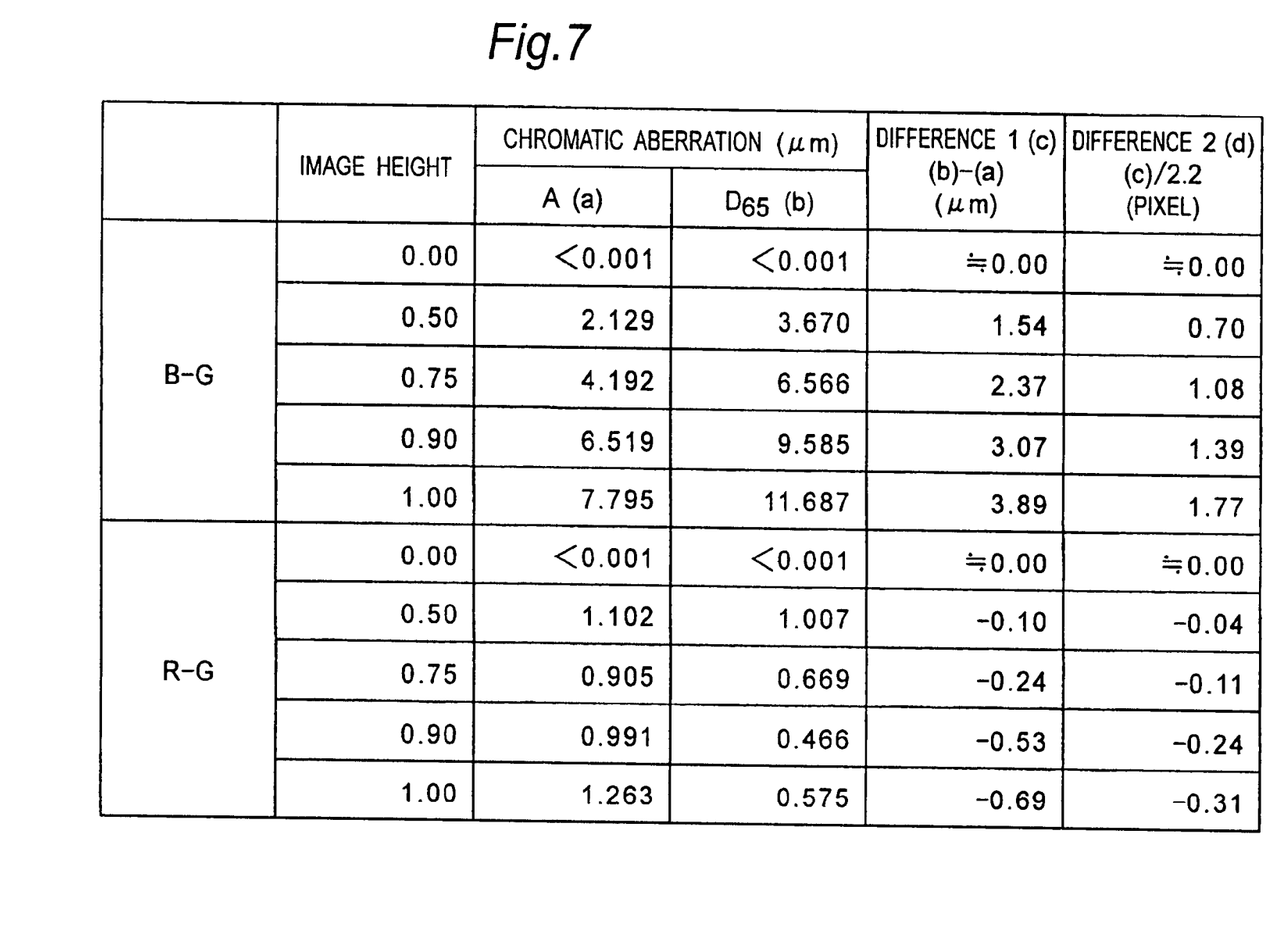
FIG. 7 is a view showing a changing amount of the chromatic aberration amount with the ambient light source.

FIG. 7 shows a result of simulation to obtain the chromatic aberration amount with respect to the image height, when the standard light A (401) and the standard light $D_{65}$(402) as shown in FIG. 4 enter the imaging device, using a combination of a CCD image sensor with aspect ratio of 1/1.8 and having sensitivity characteristics as shown in FIG. 3 and a wide angle zoom lens having a focal distance of 28 mm to 112 mm for 35 mm film.

In FIG. 7, (B-G) shows a deviation of B(blue) to G(green), (R-G) shows a deviation of R(red) to G(green), respectively. As to the chromatic aberration amount, deviations of the standard light A and standard light $D_{65}$ are shown by unit of μm, respectively. For example, when the image height is 0.75, the deviation (B-G) is 4.19.2 μm for the standard light A, and is 6.566 μm for the standard light $D_{65}$.

Difference 1(c) shows the difference in deviation ((b)−(a)) between the standard light $D_{65}$(b) and standard light A(a) by the unit of μm. Difference 2(d) is obtained by dividing the difference 1(c) by 2.2 μm as a pixel pitch of the CCD image sensor, and shows the difference in deviation by a pixel unit.

In addition, a symbol "<" shows a value smaller than the value written on the right side thereof, and a symbol "≈" shows a value nearly equal to the value written on the right side thereof, respectively.

As shown in FIG. 7, the deviation (B-G) becomes larger as the image height becomes higher, and this tendency is remarkable in the standard light $D_{65}$ rather than the standard light A. For example, when the image height is 1, the deviation by unit μm is 11.687 μm for the standard light $D_{65}$, while it is 7.795 μm for the standard light A.

At this time, the difference 1(c) which is the difference in deviation by unit μm, is about 3.89 μm, and the difference 2(d) which is the difference in deviation by pixel unit is about 1.77 pixels. Thus, it can be confirmed that the chromatic aberration amount is largely changed depending on the ambient light source. When using the CCD image sensor having higher density of pixels, namely, the CCD image sensor having smaller pixel pitches, the difference 2(d) which is the difference in deviation by pixel unit becomes still larger.

1.2 Correction Process of Chromatic Aberration Depending on Ambient Light Source Returning to FIG. 1, an A/D converter 103 converts the output of the imaging device 102 into a digital signal. The preprocessing section 104 in the image signal processing section 120 writes image data generated by the A/D converter 103 to a work memory 111 through a memory controller 108.

Then, the preprocessing section 104 reads intensity data of R(red), G(green), and B(blue) composing the image data sequentially out from the work memory 111 through the memory controller 108, and applies a predetermined process such as a gain adjustment and a gamma correction to the read intensity data. The preprocessing section 104 writes the intensity data of R(red), G(green), and B(blue) which are applied with predetermined process back to the work memory 111 through the memory controller 108.

The preprocessing section 104 reads again the intensity data of R(red), G(green), and B(blue) applied with predetermined process sequentially out from the work memory 111 through the memory controller 108 to calculate a luminance Y and color differences CR and CB.

With the intensity data of R(red), G(green), and B(blue) defined as R, G, and B, respectively, the luminance Y is generally shown in a formula (1).

$$Y = 0.30R + 0.59G + 0.11B \quad (1)$$

Also, the color differences CR and CB are generally shown in formulas (2) and (3), respectively.

$$CR = R - Y = 0.70(R-G) - 0.11(B-G) \quad (2)$$

$$CB = B - Y = 0.89(B-G) - 0.30(R-G) \quad (3)$$

The preprocessing section 104 obtains color temperature from the luminance Y and the color differences CR, CB calculated with formula (1) to formula (3) to send it to a correction information determining section 105.

Here, the preprocessing section 104 corresponds to "light information acquiring section" according to the present invention, and the color temperature corresponds to "information on the incident light" according to the present invention.

An optical system controller 109 sends, to the correction information determining section 105, information of the optical system 101 when taking a photograph, such as focal distance, aperture, and a distance to the subject to be photographed.

The correction information determining section 105 extracts, from a chromatic aberration characteristic data storage section 110 which stores chromatic aberration characteristic data of the optical system 101, a chromatic aberration correction coefficient when taking a photograph, which corresponds to the color temperature obtained by the preprocessing section 104 and the information of the optical system 101 when taking a photograph obtained from the optical system controller 109.

Figure 8:
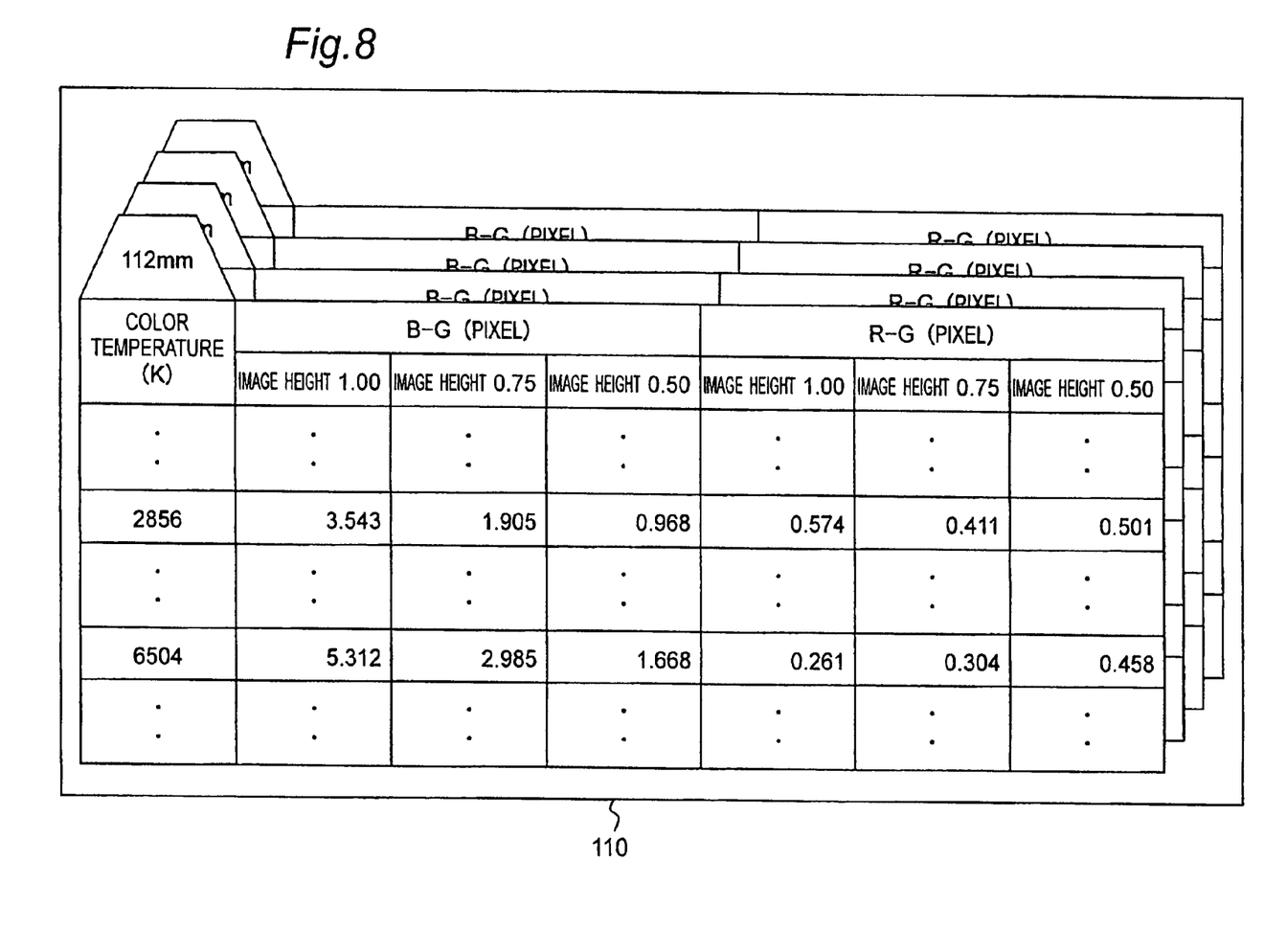
FIG. 8 is a view showing an example of chromatic aberration characteristic data.

FIG. 8 shows an example of the chromatic aberration characteristic data stored in the chromatic aberration characteristic data storage section 110.

The chromatic aberration characteristic data stored in the chromatic aberration characteristic data storage section 110 can be obtained by optical simulation using the output characteristics of the imaging device 102 and design data of the optical system 101. At this time, as shown in FIG. 6, using the gravity center in accordance with the output of each color of R (red), G(green) and B(blue), the deviation of R(red) to G(green) and deviation of B(blue) to G(green) are stored as a distance from the center of the imaging device 102, namely, as a function of the image height. This makes it possible to reduce the chromatic aberration characteristic data in data size, and expand versatility of the characteristic data.

In FIG. 8, for simplification, only the focal distance in taking a photograph is used as information of the optical system 101 when taking a photograph obtained from the optical system controller 109.

In FIG. 8, a symbol "•" shows that the value is omitted. In FIG. 8, on the assumption of the optical system 101 having the focal distance of 28 mm to 112 mm in a film equivalent of 35 mm, four types of tables of wide angle end 28 mm, 56 mm, 84 mm, and a telescope end 112 mm are prepared. FIG. 8 implies that there are tables for three focal distances behind the table for the focal distance of 112 mm.

For example, it is found that, when the focal distance is 112 mm and if the color temperature is 6504K, the chromatic aberration correction coefficient of the pixel at a position of the image height of 0.75 to which the color filter of B(blue) is provided is 2.985 pixels.

When the chromatic aberration characteristic data storage section 110 dose not store the chromatic aberration correction coefficient, which corresponds to the color temperature obtained by the preprocessing section 104 and the information of the optical system 101 when taking a photograph obtained from the optical system controller 109, the chromatic aberration correction coefficient when taking a photograph is calculated or extracted by interpolation from chromatic aberration correction coefficients before and after the chromatic aberration correction coefficient to be calculated.

The chromatic aberration correction coefficient when taking a photograph extracted as described above corresponds to the color temperature when taking a photograph, and therefore reflects the type of the ambient light source when taking a photograph. Further it corresponds to the focal distance when taking a photograph, and therefore it reflects the information of the optical system 101 when taking a photograph. The correction information determining section 105 sends the extracted chromatic aberration correction coefficient when taking a photograph to the correction processing section 106.

The correction processing section 106 sequentially reads intensity data of R(red), G(green), and B(blue) applied with predetermined process such as gain adjustment and gamma correction by the preprocessing section 104, through the memory controller 108 out from the work memory 111, and applies chromatic aberration correction to the read intensity data using the extracted chromatic aberration correction coefficient when taking a photograph which is received from the correction information determining section 105.

Figure 9:
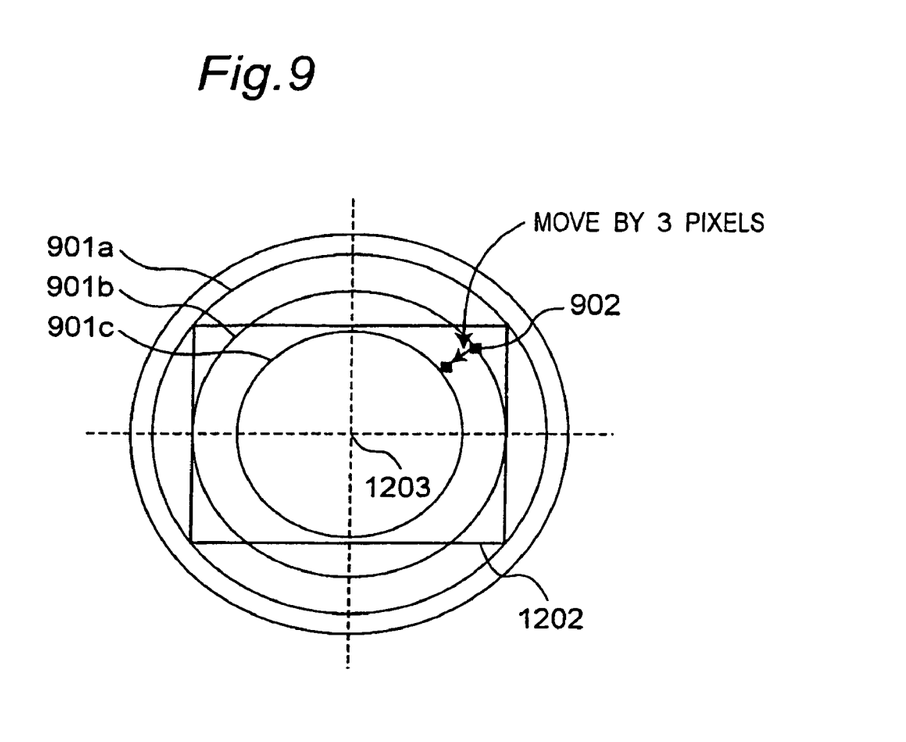
FIG. 9 is a view for explaining a chromatic aberration correction.

FIG. 9 shows a conceptual view of the chromatic aberration correction. FIG. 9 is a view of an imaging device 1202 viewed along a direction of an optical axis 1203 in the same way as FIG. 12B. Three concentric circles sharing the optical axis 1203 as a center axis includes a concentric circle 901a with image height of 1.00, a concentric circle 901b with image height of 0.75, and a concentric circle 901c with image height of 0.50.

As shown in FIG. 8, the chromatic aberration correction coefficient of a pixel 902 which is provided with the color filter of B(blue) and positioned at the image height of 0.75 is 2.985 pixels for the color temperature of 6504K. Therefore, the intensity data of B(blue) of the pixel 902 provided with the color filter of B(blue) and positioned at the image height of 0.75 is moved (corrected) by 3 pixels toward the optical axis 1203. Although the chromatic aberration correction coefficient is 2.985 pixels, actually it is rounded to be 3 pixels since it should be integer.

The same process can be applied to the pixel provided with the color filter of R(red). Also, the same process can be applied for the concentric circle 901a with the image height of 1.00 and the concentric circle 901c with the image height of 0.50. For example, the chromatic aberration correction coefficient of a pixel which is provided with the color filter of R(red) and positioned at the image height of 0.5 is 0.501 pixels for the color temperature of 2856K. Therefore in this case, intensity data of R(red) of the pixel is shifted by one pixel toward the optical axis 1203. As to a pixel which is not positioned on the three concentric circles 901a, 901b and 901c, the chromatic aberration correction coefficient is calculated by interpolation.

As described above, the correction processing section 106 writes the image data with all of pixels on the imaging device 102 subjected to the chromatic aberration correction, back to the work memory 111 through the memory controller 108.

It is noted that the chromatic aberration characteristic data storage section 110, the correction information determining section 105, and the correction processing section 106 correspond to "correction processing section" according to the present invention.

The image processing section 107 sequentially reads the image data that has undergone the chromatic aberration correction, out from the work memory 111 through the memory controller 108. At this time, the individual pixel has only the intensity data of either one color of R(red), G(green), and B(blue). For example, a pixel 201 provided with the color filter of B(blue) as shown in FIG. 2 has only the intensity data of B(blue) by itself, and thus the intensity data of G(green) and R(red) for the pixel 201 are obtained by interpolation from values of peripheral pixels. In this way, all of the pixels are made to have the intensity data of R(red), G(green), and B(blue).

Afterward, the image processing section 107 applies image processing for adjusting the characteristic of the image data to be suitable for the human eye, such as a distortion correction, a saturation correction, and an edge emphasis processing, to the image data. Then it compresses and encodes the data into a desired file format such as a JPEG format, and writes the data back to the work memory 111 through the memory controller 108.

The memory controller 108 records the image data that has undergone all the processing, to a memory device 112. It is noted that the image signal processing section 120 including the preprocessing section 104, the correction information determining section 105, the correction processing section 106, the image processing section 107 and the memory controller 108 can be realized in one image processing LSI. The functions of the image signal processing section 120 can be achieved by hardware and/or software.

1.3 Conclusion

As described above, according to the first embodiment of the present invention, the preprocessing section 104 (a light information acquiring section) acquires color temperature which is information on the light that enters the imaging apparatus. The chromatic aberration characteristic data storage section 110, correction information determining section 105, and correction processing section 106 convert pixel position of each pixel in the image data generated by the imaging device 102, based on the color filter type, color temperature acquired by the preprocessing device 104 as information on light entering the imaging device, and the focal distance as information on the optical system 101. Hence it is possible to correct the image data according to change of the chromatic aberration occurring depending on type of the ambient light source.

1.4 Variations and Modifications

In the first embodiment of the present invention, the chromatic aberration characteristic data is defined as a function of the color temperature obtained from luminance Y and color differences CR and CB obtained from the image data imaged by the imaging device 102, and the information of the optical system 101 when taking a photograph obtained from the optical system controller 109. However the chromatic aberration characteristic data may be any function as long as it is information related to the image data and the chromatic aberration changing amount obtained from the optical system. Also, the chromatic aberration characteristic data may be a function of information obtained from the other type of light information acquiring section that acquires information on the light that enters the imaging apparatus, for example, an exposure meter and a color temperature sensor.

When the imaging apparatus has a movable lens for correcting shake in the optical system 101 to suppress the influence of handshake, chromatic aberration characteristic data depending on movement information of the movable lens may be previously stored in the chromatic aberration characteristic data storage section 110.

The optical system controller 109 may sends the movement information of the movable lens to the correction information determining section 105 in addition to the focal distance, aperture value, a distance to a subject to be photographed, or the like, as the information of the optical system 101 when taking a photograph. Thus it is possible to achieve chromatic aberration correction according to the movement of the movable lens.

When the optical system 101 is integrally formed with the imaging apparatus main body, it is desirable to dispose the chromatic aberration characteristic data storage section 110 in the vicinity of the correction information determining section 105. On the contrary, when the optical system 101 is detachable from the imaging apparatus main body, the chromatic aberration characteristic data storage section 110 may be provided in the optical system 101.

Since the chromatic aberration characteristic data is read directly from the optical system 101, even a new optical system 101 can be used immediately. In this case, by storing the chromatic characteristic data corresponding to a size, number of pixels, and output characteristic of the imaging devices 102 of a plurality of imaging apparatuses to the chromatic aberration characteristic data storage section 110, compatibility of the optical imaging device 101 is further improved.

When the imaging apparatus includes a removable memory device 112 such as a memory card, the chromatic characteristic data holding section 110 may be provided in the memory card.

Alternately, the present invention can be applied to the following imaging apparatus having a plurality of imaging devices. That is, in the imaging apparatus, each imaging device includes a plurality of pixels with one color type of color filters disposed before the pixels in the optical path, and each imaging device have different type of color filter. One piece of image data is composed of data generated by the plurality of imaging devices.

For example, there is an imaging apparatus which is put into practical use and has a prism disposed behind the optical system 101. The imaging apparatus disperses an incident light into R(red), G(green) and B(blue) by the prism, renders the dispersed lights to be imaged on three CCD image sensors provided with color filters of R(red), G(green) and B(blue), and synthesizes the image data imaged on the CCD image sensors to generate complete image data. The present invention can also be applied to the imaging apparatus thus configured.

Further, the calculation of the chromatic aberration correction coefficient is not limited to a method described in the first embodiment of the present invention, but another means may be used. A color model is not limited to primary colors, but may be the other color model such as complementary colors.

When the imaging apparatus has a light source setting section for setting type of a light source according to a circumstance, the light source setting section may be used for the light information acquiring section for acquiring information on the incident light. For example, when the light source setting section has a function of selecting optimal light source type from preset light source types such as an incandescent electric lamp and sunlight according to status when taking a photograph, and a function of setting a white balance with a manual operation, the light source setting section can be used for the light information acquiring section.

It is noted that as the preset light source type, shade, cloudiness, a fluorescent lamp, and flash, or the like can be generally set in addition to the aforementioned incandescent electric lamp and sunlight. Further, specific light source such as a mercury lamp and a neon lamp can also be included in the preset light source type.

Second Embodiment 2.1 Response to High Lightness Contrast Image

The digital still camera of the first embodiment of the present invention calculates the chromatic aberration correction coefficient using whole image data of one piece of image generated by the imaging device 102. However, the whole image data of one piece of image possibly includes both of a suitable part and an unsuitable part for calculating the chromatic aberration correction coefficient.

For example, when the lightness contrast of the image is extremely high like photographing under sunshine filtering through foliage, it is not necessarily optimum to use whole image data to calculate the chromatic aberration correction coefficient. This is because the chromatic aberration correction coefficient to be obtained changes depending on part of the image from which the color temperature is obtained. This is true for a case that luminance is saturated in a part of the image.

Figure 10:
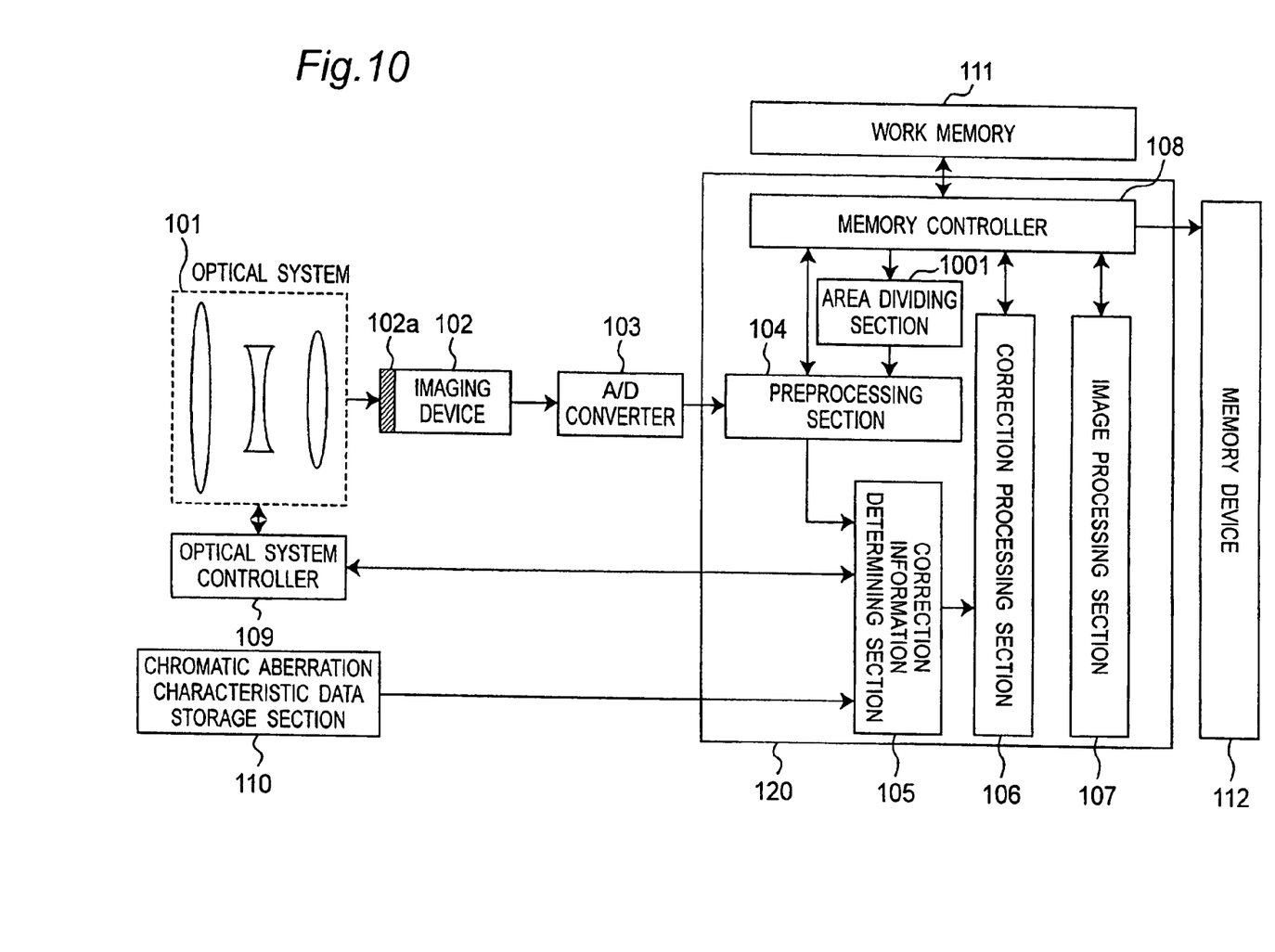
FIG. 10 is a block diagram of an imaging apparatus according to a second embodiment of the present invention.

Therefore, the digital still camera of the second embodiment of the present invention uses only a suitable part for calculating the chromatic aberration correction coefficient of the whole image data generated by the imaging device 102, to calculate the chromatic aberration correction coefficient.

FIG. 10 is a block diagram showing the configuration of the digital still camera, as an example of the imaging apparatus according to the second embodiment of the present invention.

In FIG. 10, a different point from the first embodiment of the present invention is providing an area dividing section 1001 connected to the memory controller 108 and the preprocessing section 104. The same things and numerals are assigned to the same constituent elements of the first embodiment and an explanation thereof is omitted.

Figure 11:
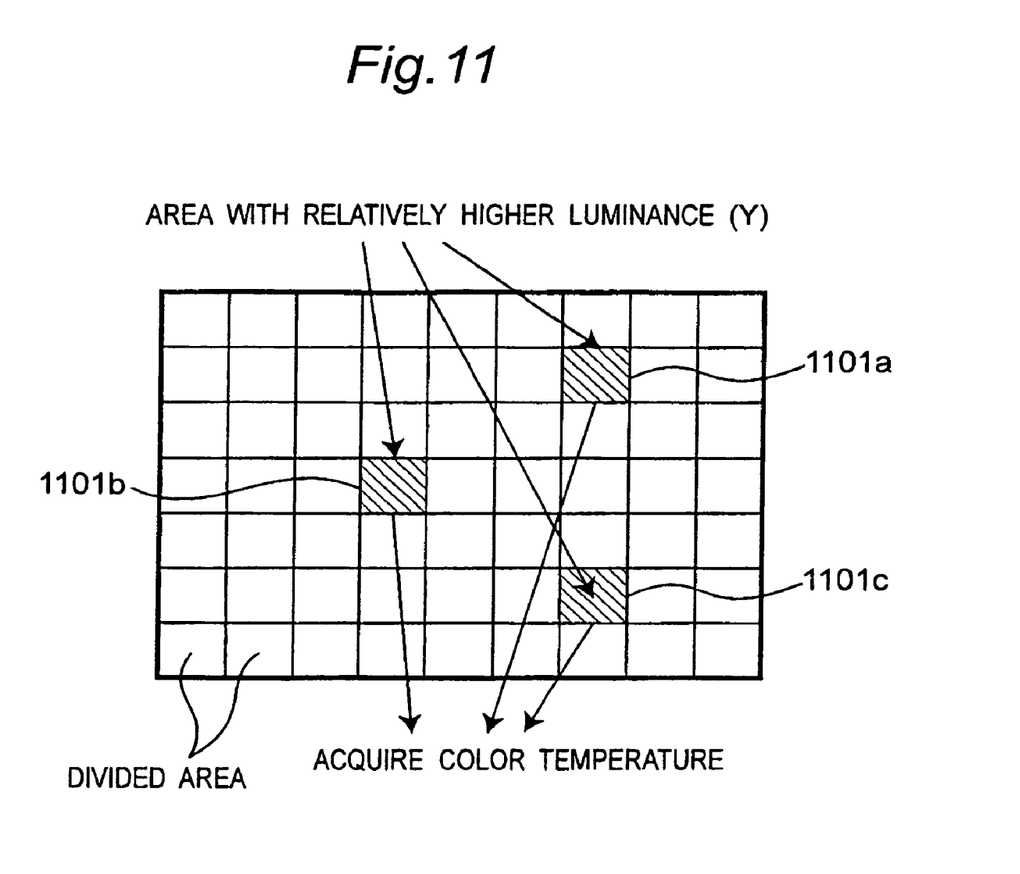
FIG. 11 is a view for explaining extraction of a color temperature from areas with higher luminance (Y).

The area dividing section 1001 manages whole image data area which is divided into a plurality of areas, as shown in FIG. 11, in unit of divided area, and enables readout of image data for each divided area.

The preprocessing section 104 writes data for one piece of image data in the work memory 111 through the memory controller 108. Next, the preprocessing section 104 reads sequentially the intensity data of R(red), G(green), and B(blue) composing the image data for one divided area through the area dividing section 1001 as shown in FIG. 11 from the work memory 111 through the memory controller 108 to calculate the luminance Y.

Similar processing is repeated to calculate the luminance Y for all of the divided areas. The color temperature is obtained from three areas which have relatively higher luminance Y. For example, in the example of FIG. 11, the color temperature is obtained from three areas 1101a, 1101b and 1101c which have relatively higher luminance Y.

Based on the color temperature thus obtained, the chromatic aberration correction coefficient corresponding to the ambient light source is calculated, and afterward the same processing as that of the first embodiment is performed. Thus, the chromatic aberration correction suitable for the ambient light source can be applied to even the image with high lightness contrast.

2.2 Variations and Modifications

In this embodiment, the color temperature is obtained from the three areas 1101a, 1101b and 1101c having relatively higher luminance Y. However, it is enough to select at least one divided area for color temperature calculation. In addition, in the divided area where the luminance Y is saturated, an accurate color temperature can not be obtained. Therefore, it is desirable to obtain the color temperature from the divided area where the luminance Y is not saturated and adjacent to the divided area where the luminance Y is saturated.

Further, when the luminance Y in a certain area is particularly high and the intensity data of B(blue) in the area is saturated, it may be so judged that there is a high possibility of photographing outside and under clear weather, and the chromatic aberration correction coefficient in accordance with the luminance Y may be calculated without the color temperature calculation. Thus, a desired correction is possible by previously storing the chromatic aberration amount for photographing outside and under the clear weather.

Further, the chromatic aberration correction coefficient may be calculated for each of divided areas. Thus, a suitable chromatic aberration correction is possible over a whole region of the image.

INDUSTRIAL APPLICABILITY

The imaging apparatus and image data correcting method of the present invention are capable of correcting a chromatic aberration excellently in accordance with the ambient light source even when using a relatively inexpensive small-sized optical system having not so high optical performance. Therefore it is useful to an imaging apparatus such as a digital still camera and image data correcting method in the digital still camera.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2005-371449, filed on Dec. 26, 2006, which is expressly incorporated herein by reference in its entirety.

What is claimed is:

1. An image apparatus comprising:
   an optical system operable to form an image of a subject;
   plural types of color filters;
   an image device including a plurality of pixels each of which receives a light incident to the imaging apparatus through a predetermined type of color filter and begin operable to generate analog image signals at the plurality of pixels from the image formed by the optical system;
   an AD converter operable to generate image data subjected to digital processing, from the analog image signals from the imaging device;
   a divider operable to divide an image presented by the image data generated by the AD converter into a plurality of divided regions;
   a light information acquiring section operable to acquire information on the incident light; and
   a correction processing section operable to convert a position of a pixel of the image data, according to type of the color filter provided for the pixel and the information on the incident light acquired by the light information acquiring section,
   wherein the light information acquiring section acquires the information on the incident light based on image data of a predetermined number of divided regions which are selected from the plurality of divided regions based on a level of luminance of each divided region of the plurality of divided regions.

2. The imaging apparatus according to claim 1, wherein the predetermined number of divided regions includes three divided regions having high luminance relative to the remainder of the plurality of divided regions, and the three divided regions are selected from the plurality of divided regions based on the level of luminance of each of the divided regions.

3. The imaging apparatus according to claim 1, wherein at least a divided region with a highest level of luminance among the plurality divided regions is selected as one of the predetermined number of divided regions.

4. An imaging apparatus comprising:
   an optical system operable to form an image of a subject;
   plural types of color filters;
   a plurality of imaging devices, each imaging device including a plurality of pixels, each pixel receiving a light incident to the imaging apparatus through a color filter, type of the color filter provided for each imaging device is different depending on the imaging device, the plurality of imaging devices being operable to generate analog image signals at the plurality of pixels from the image formed by the optical system;

an AD converter operable to generate image data subjected to digital processing, from the analog signals from the imaging device;

a divider operable to divide the image presented by the image data generated by the AD converter into a plurality of divided regions;

a light information acquiring section operable to acquire information on the incident light; and a correction processing section operable to convert a position of a pixel of the image data, according to type of the color filter provided for the pixel and the information on the incident light acquired by the light information acquiring section, wherein the light information acquiring section acquires information on the incident light based on image data of a predetermined number of divided regions which are selected from the plurality of divided regions based on a level of luminance of each divided region of the plurality of divided regions.

5. The imaging apparatus according to claim 4, wherein the predetermined number of divided regions includes three divided regions having high luminance relative to the remainder of the plurality of divided regions, and the three divided regions are selected from the plurality of divided regions based on the level of luminance of each of the divided regions.

6. The imaging apparatus according to claim 4, wherein at least a divided region with a highest level of luminance among the plurality divided regions is selected as one of the predetermined number of divided regions.

7. A method of correcting image data which is generated based on analog image signals generated by an imaging device having a plurality of pixels receiving incident light through a plurality of color filters, the method comprising:

generating image data subjected to digital processing, from the analog image signals from the imaging device;

dividing an image presented by the generated image data into a plurality of divided regions;

acquiring information on the incident light based on image data of a predetermined number of divided regions which are selected from the plurality of divided regions based on a level of luminance of each divided region of the plurality of divided regions; and converting a position of a pixel of the image data, according to type of the color filter provided for the pixel and the information on the incident light.

8. The method according to claim 7, wherein the predetermined number of divided regions includes three divided regions having high luminance relative to the remainder of the plurality of divided regions, and the three divided regions are selected from the plurality of divided regions based on the level of luminance of each of the divided regions.

9. The method according to claim 7, wherein at least a divided region with a highest level of luminance among the plurality divided regions is selected as one of the predetermined number of divided regions.

10. A method of correcting image data which is generated based on analog image signals generated by a plurality of imaging devices, each imaging device having a plurality of pixels, each pixel receiving incident light through a color filter, type of a color filter provided for each imaging device is different depending on the imaging device, the method comprising:

generating image data subjected to digital processing, from the analog image signals from the imaging device;

dividing an image presented by the generated image data into a plurality of divided regions;

acquiring information on the incident light based on image data of a predetermined number of divided regions which are selected from the plurality of divided regions based on a level of luminance of each divided region of the plurality of divided regions; and converting a position of a pixel of the image data, according to type of the color filter provided for the pixel and the information on the incident light.

11. The method according to claim 10, wherein the predetermined number of divided regions includes three divided regions having high luminance relative to the remainder of the plurality of divided regions, and the three divided regions are selected from the plurality of divided regions based on the level of luminance of each of the divided regions.

12. The method according to claim 10, wherein at least a divided region with a highest level of luminance among the plurality divided regions is selected as one of the predetermined number of divided regions.

* * * * *